(12) United States Patent
Bowman

(10) Patent No.: US 9,940,492 B2
(45) Date of Patent: Apr. 10, 2018

(54) BAND WITH RFID CHIP HOLDER AND IDENTIFYING COMPONENT

(71) Applicant: S.P.M. Flow Control, Inc., Fort Worth, TX (US)

(72) Inventor: Jordan Bowman, Henderson, CO (US)

(73) Assignee: S.P.M. FLOW CONTROL, INC., Fort Worth, TX (US)

( * ) Notice: Subject to any disclaimer, the term of this patent is extended or adjusted under 35 U.S.C. 154(b) by 231 days.

(21) Appl. No.: 14/812,751

(22) Filed: Jul. 29, 2015

(65) Prior Publication Data

US 2016/0032707 A1 Feb. 4, 2016

Related U.S. Application Data

(60) Provisional application No. 62/031,156, filed on Jul. 30, 2014.

(51) Int. Cl.
*E21B 47/12* (2012.01)
*G06K 7/10* (2006.01)
*E21B 43/26* (2006.01)

(52) U.S. Cl.
CPC .......... *G06K 7/10366* (2013.01); *E21B 43/26* (2013.01); *E21B 47/122* (2013.01)

(58) Field of Classification Search
CPC .... E21B 43/26; E21B 47/122; G06K 7/10366
See application file for complete search history.

(56) References Cited

U.S. PATENT DOCUMENTS

| | | | |
|---|---|---|---|
| 2,007,203 A | 7/1935 | Kraeft | |
| 2,191,782 A | 2/1940 | Valane | |
| 3,331,385 A | 7/1967 | Taylor | |
| 3,465,572 A | 9/1969 | Thomas | |
| 3,742,756 A | 7/1973 | Seager | |
| 3,808,879 A | 5/1974 | Rogers | |
| 4,044,833 A | 8/1977 | Volz | |

(Continued)

FOREIGN PATENT DOCUMENTS

| AR | 84750 | 11/2012 |
|---|---|---|
| AU | 346763 | 2/2013 |

(Continued)

OTHER PUBLICATIONS

International Search Report and Written Opinion dated Oct. 5, 2015 re International Application No. PCT/US15/42694 (12 pages).

(Continued)

*Primary Examiner* — Yong-Suk Ro
(74) *Attorney, Agent, or Firm* — Haynes and Boone, LLP

(57) ABSTRACT

An apparatus is adapted to be coupled to a component of a system associated with a wellhead. The apparatus includes a band adapted to be coupled to the component; a buckle coupled to the band and located proximate to a first end of the band; a holder coupled to the band, wherein the holder is positioned, or is adapted to be positioned, proximate to the first end; an electronic identifying device attached to the holder and adapted to identify the component; and an identifying component coupled to the band. The identifying component visually conveys information about at least one of: the electronic identifying device, and the component to which the band is adapted to be coupled. In one embodiment, the system associated with the wellhead is a system for pumping fluid to the wellhead. The electronic identifying device is, or includes, an RFID chip.

20 Claims, 9 Drawing Sheets

(56) References Cited

U.S. PATENT DOCUMENTS

| | | |
|---|---|---|
| 4,185,802 A | 1/1980 | Myles et al. |
| 4,329,925 A | 5/1982 | Hane et al. |
| 4,432,064 A | 2/1984 | Barker et al. |
| 4,574,880 A | 3/1986 | Handke |
| 4,866,607 A | 9/1989 | Anderson et al. |
| 4,916,641 A | 4/1990 | Bybee |
| 5,063,775 A | 11/1991 | Walker, Sr. et al. |
| 5,105,881 A | 4/1992 | Thoms et al. |
| D326,927 S | 6/1992 | Catalina |
| 5,269,180 A | 12/1993 | Dave et al. |
| 5,360,967 A | 11/1994 | Perkin et al. |
| 5,372,195 A | 12/1994 | Swanson et al. |
| 5,377,104 A | 12/1994 | Sorrells et al. |
| D354,677 S | 1/1995 | Troyer |
| D365,927 S | 1/1996 | Cho |
| D368,218 S | 3/1996 | Klein, III |
| 5,509,303 A | 4/1996 | Georgi |
| D371,370 S | 7/1996 | Fenton et al. |
| 5,722,490 A | 3/1998 | Ebinger |
| D406,590 S | 3/1999 | Heiligenstein et al. |
| D408,269 S | 4/1999 | Ross |
| D408,716 S | 4/1999 | Vesledahl |
| 6,123,394 A | 9/2000 | Jeffrey |
| 6,346,886 B1 | 2/2002 | De La Huerga |
| 6,434,500 B1 | 8/2002 | Boehne et al. |
| 6,457,529 B2 | 10/2002 | Calder et al. |
| 6,480,100 B1 | 11/2002 | Frieden et al. |
| 6,567,752 B2 | 5/2003 | Cusumano et al. |
| 6,592,822 B1 | 7/2003 | Chandler |
| 6,597,175 B1 | 7/2003 | Brisco |
| 6,648,606 B2 | 11/2003 | Sabini et al. |
| D492,670 S | 7/2004 | Hung et al. |
| D495,223 S | 8/2004 | Altman |
| 6,820,694 B2 | 11/2004 | Willberg et al. |
| 6,829,542 B1 | 12/2004 | Reynolds et al. |
| 6,831,571 B2 | 12/2004 | Bartel |
| 6,836,215 B1 | 12/2004 | Laurash et al. |
| 6,922,641 B2 | 7/2005 | Batzinger et al. |
| 6,989,764 B2 | 1/2006 | Thomeer et al. |
| 7,064,668 B2 | 6/2006 | Porad |
| 7,069,776 B2 | 7/2006 | Tudor |
| D527,378 S | 8/2006 | Raymond et al. |
| 7,083,391 B2 | 8/2006 | Sievert et al. |
| 7,096,718 B2 | 8/2006 | Matzner et al. |
| 7,096,961 B2 | 8/2006 | Clark et al. |
| 7,137,451 B2 | 11/2006 | Smith |
| D535,982 S | 1/2007 | Inoue |
| 7,159,654 B2 | 1/2007 | Ellison et al. |
| D538,630 S | 3/2007 | Sergi |
| 7,239,977 B2 | 7/2007 | Fantana et al. |
| 7,242,317 B2 | 7/2007 | Silvers |
| 7,259,675 B2 | 8/2007 | Baker et al. |
| D551,662 S | 9/2007 | Buren et al. |
| 7,267,798 B2 | 9/2007 | Chandler |
| 7,272,529 B2 | 9/2007 | Hogan et al. |
| 7,301,474 B2 | 11/2007 | Zimmerman |
| 7,308,331 B2 | 12/2007 | Bjornson |
| 7,383,882 B2 | 6/2008 | Lerche et al. |
| 7,389,870 B2 | 6/2008 | Slappay |
| D573,589 S | 7/2008 | Montgomery et al. |
| 7,395,188 B1 | 7/2008 | Goebel et al. |
| 7,400,263 B2 | 7/2008 | Snider et al. |
| 7,412,898 B1 | 8/2008 | Smith et al. |
| D578,521 S | 10/2008 | Sergi et al. |
| 7,433,789 B1 | 10/2008 | Balestra |
| 7,477,160 B2 | 1/2009 | Lemenager et al. |
| 7,484,625 B2 | 2/2009 | Scott et al. |
| D597,086 S | 7/2009 | Sergi et al. |
| 7,557,716 B2 | 7/2009 | Morbitzer et al. |
| D598,274 S | 8/2009 | Nerskov |
| 7,579,950 B2 | 8/2009 | Lerch et al. |
| 7,603,296 B2 | 10/2009 | Whiteley et al. |
| 7,606,682 B2 | 10/2009 | Denny et al. |
| D603,383 S | 11/2009 | Nyalamadugu et al. |
| 7,619,523 B2 | 11/2009 | Durtschi et al. |
| D607,442 S | 1/2010 | Su et al. |
| 7,657,468 B1 | 2/2010 | Whiteley et al. |
| 7,664,685 B1 | 2/2010 | Whiteley et al. |
| 7,684,936 B2 | 3/2010 | Bechhoefer |
| D620,483 S | 7/2010 | Conrad et al. |
| 7,819,182 B2 | 10/2010 | Adamek |
| 7,823,640 B2 | 11/2010 | Flanders |
| 7,832,258 B2 | 11/2010 | Mudge et al. |
| 7,849,619 B2 | 12/2010 | Mosher et al. |
| 7,893,832 B2 | 2/2011 | Laackmann |
| 7,912,678 B2 | 3/2011 | Denny et al. |
| 7,928,922 B2 | 4/2011 | King |
| D651,591 S | 1/2012 | Hunter et al. |
| D651,592 S | 1/2012 | Hunter et al. |
| D651,593 S | 1/2012 | Hunter et al. |
| 8,116,990 B2 | 2/2012 | Koul |
| 8,120,497 B2 | 2/2012 | Binmore |
| D655,081 S | 3/2012 | Maravilla et al. |
| 8,289,173 B2 | 10/2012 | Ben-Mansour et al. |
| 8,485,448 B2 | 7/2013 | Maizlin et al. |
| D690,687 S | 10/2013 | Sun et al. |
| D713,825 S | 9/2014 | Witkowski et al. |
| 8,857,683 B2 | 10/2014 | Cameron et al. |
| 8,985,156 B2 | 3/2015 | Drouin et al. |
| D726,702 S | 4/2015 | Umlauf |
| D731,171 S | 6/2015 | Upchurch |
| 2001/0047283 A1 | 11/2001 | Melick et al. |
| 2002/0158120 A1 | 10/2002 | Zierolf |
| 2003/0139982 A1 | 7/2003 | Schwartz et al. |
| 2003/0192690 A1 | 10/2003 | Carlson et al. |
| 2003/0209133 A1 | 11/2003 | Greenfield et al. |
| 2004/0051368 A1 | 3/2004 | Caputo et al. |
| 2004/0052202 A1 | 3/2004 | Brollier |
| 2004/0074974 A1 | 4/2004 | Senba et al. |
| 2004/0078306 A1 | 4/2004 | Whiteley et al. |
| 2004/0088115 A1 | 5/2004 | Guggari et al. |
| 2004/0107823 A1 | 6/2004 | Kiley et al. |
| 2005/0087235 A1 | 4/2005 | Skorpik et al. |
| 2005/0242962 A1 | 11/2005 | Lind et al. |
| 2006/0022056 A1 | 2/2006 | Sakama et al. |
| 2006/0028344 A1 | 2/2006 | Forster |
| 2006/0043199 A1 | 3/2006 | Baba et al. |
| 2006/0076419 A1 | 4/2006 | Johnson |
| 2006/0261958 A1 | 11/2006 | Klein |
| 2007/0018825 A1 | 1/2007 | Morbitzer et al. |
| 2007/0042820 A1 | 2/2007 | Cloonan |
| 2007/0124220 A1 | 5/2007 | Griggs et al. |
| 2007/0159336 A1 | 7/2007 | Tethrake et al. |
| 2007/0171075 A1 | 7/2007 | Ryu |
| 2007/0181726 A1 | 8/2007 | Ishikawa et al. |
| 2007/0226487 A1 | 9/2007 | Li et al. |
| 2008/0009149 A1 | 1/2008 | Arms et al. |
| 2008/0009185 A1 | 1/2008 | Knoll et al. |
| 2008/0029541 A1 | 2/2008 | Wallace et al. |
| 2008/0252459 A1 | 10/2008 | Butler et al. |
| 2009/0006153 A1 | 1/2009 | Greiner et al. |
| 2009/0055293 A1 | 2/2009 | Mueller |
| 2009/0058610 A1 | 3/2009 | Krebs et al. |
| 2009/0094872 A1 | 4/2009 | Ali et al. |
| 2009/0112308 A1 | 4/2009 | Kassem |
| 2009/0121895 A1 | 5/2009 | Denny et al. |
| 2009/0188675 A1 | 7/2009 | Bloom et al. |
| 2009/0205820 A1 | 8/2009 | Koederitz et al. |
| 2009/0208295 A1 | 8/2009 | Kinert et al. |
| 2009/0307763 A1 | 12/2009 | Rawlins et al. |
| 2010/0051286 A1 | 3/2010 | McStay et al. |
| 2010/0096455 A1 | 4/2010 | Binmore |
| 2010/0123586 A1 | 5/2010 | Baba et al. |
| 2010/0326219 A1 | 12/2010 | Nelson et al. |
| 2011/0052423 A1 | 3/2011 | Gambier et al. |
| 2011/0060568 A1 | 3/2011 | Goldfine et al. |
| 2011/0139877 A1 | 6/2011 | Szakelyhidi et al. |
| 2011/0233283 A1 | 9/2011 | Hansen |
| 2011/0240747 A1 | 10/2011 | Stewart et al. |
| 2011/0253793 A1 | 10/2011 | King |
| 2011/0270525 A1 | 11/2011 | Hunter |
| 2011/0273296 A1 | 11/2011 | Laase et al. |
| 2012/0061091 A1 | 3/2012 | Radi |

(56) References Cited

U.S. PATENT DOCUMENTS

| | | |
|---|---|---|
| 2013/0209277 A1 | 8/2013 | Locke |
| 2013/0317750 A1 | 11/2013 | Hunter |
| 2016/0032707 A1 | 2/2016 | Bowman |

FOREIGN PATENT DOCUMENTS

| | | |
|---|---|---|
| AU | 346764 | 2/2013 |
| AU | 346765 | 2/2013 |
| AU | 346766 | 2/2013 |
| AU | 2011245111 | 8/2015 |
| CA | 1333962 C | 1/1995 |
| CA | 2486126 A1 | 10/2005 |
| CA | 2515233 C | 10/2009 |
| CA | 2604118 C | 6/2010 |
| CA | 148446 | 8/2014 |
| CN | 1179196 A | 4/1998 |
| CN | 1862278 A | 11/2006 |
| CN | 101038639 A | 9/2007 |
| CN | 201035846 Y | 3/2008 |
| CN | 201142169 Y | 10/2008 |
| CN | 101320259 A | 12/2008 |
| CN | 101561676 A | 10/2009 |
| CN | 102003167 A | 4/2011 |
| CN | 1920901 B | 6/2011 |
| CN | 102312728 A | 1/2012 |
| CN | ZL201230542463 | 10/2013 |
| CN | 103793733 A | 5/2014 |
| DE | 102009043267 A1 | 4/2011 |
| EC | D-002132621-0001 | 11/2012 |
| EC | D-002132621-0002 | 11/2012 |
| EP | 0280489 A2 | 8/1988 |
| EP | 1895452 A1 | 3/2008 |
| FR | 2936039 A1 | 3/2010 |
| FR | 2955936 A1 | 8/2011 |
| GB | 2419671 A | 5/2006 |
| GB | 2475195 A | 5/2011 |
| JP | 11352243 | 12/1999 |
| JP | 2002352199 A | 12/2002 |
| JP | 2003035380 A | 2/2003 |
| JP | 2003139271 A | 5/2003 |
| JP | 2003185056 A | 7/2003 |
| JP | 2004213945 A | 7/2004 |
| JP | 2005181111 A | 7/2005 |
| JP | 2005335737 A | 12/2005 |
| JP | 2008033706 A | 2/2008 |
| JP | 2009083576 A | 4/2009 |
| JP | 2010152662 A | 7/2010 |
| JP | 4767148 B2 | 9/2011 |
| KR | 20050105674 A | 11/2005 |
| KR | 20060125151 A | 12/2006 |
| KR | 849955 B1 | 8/2008 |
| KR | 100919509 B1 | 9/2009 |
| KR | 20100012277 A | 2/2010 |
| KR | 20120065631 A | 6/2012 |
| NO | 083874 | 3/2013 |
| PK | 16438-D | 5/2013 |
| SG | 146464 A1 | 10/2008 |
| SG | D2012/1277 F | 12/2012 |
| SG | D2012/1278 B | 12/2012 |
| TW | M305600 U | 2/2007 |
| TW | M305862 U | 2/2007 |
| WO | WO-2008012933 A1 | 1/2008 |
| WO | WO-2009089580 A1 | 7/2009 |
| WO | WO-2010018356 A2 | 2/2010 |
| WO | WO-2010086596 A1 | 8/2010 |
| WO | WO-2011137460 A2 | 11/2011 |
| WO | WO-2012094503 A2 | 7/2012 |
| WO | WO-2012119048 A2 | 9/2012 |
| WO | WO-2013177353 A2 | 11/2013 |

OTHER PUBLICATIONS

International Search Report and Written Opinion, dated Nov. 4, 2016, by the ISA/US, re PCT/US16/46364, 21 pages.
Pakistan Office Action re App. No. 16438-D, dated Aug. 11, 2012.
Office Action dated May 19, 2017, by the USPTO, re U.S. Appl. No. 15/233,647.
"Australia Exam Report, dated Oct. 24, 2014, re App No. 2011245111".
"Australian Exam Report, dated Jul. 26, 2013, by IP Australia, re App No. 2011245111".
"Azerbaijan office action dated Sep. 17, 2013, re App No. S20120046".
"Canadian Exam Report, by the CIPO, dated May 2, 2014, re App No. 2797081".
"Canadian Exam Report dated Jan. 13, 2014, by the CIPO, re App No. 148446".
"Canadian Exam Report, dated Aug. 20, 2013, by the CIPO, re App No. 148446".
"Canadian Office Action dated Jun. 4, 2015, by the CIPO, re App No. 2797081".
"Chinese Office Action, dated Apr. 9, 2015, re App No. 201180032488.0".
"Chinese Office Action, dated Aug. 8, 2014, re App No. 201180032488.0".
E&P, "New Wireless Solution Improves Visibility, Value, Safety," Terence Leung, 2010, p. 20.
"Eurasia Office Action, dated Apr. 13, 2015, re App No. 2012291142".
"Final Office Action, dated Apr. 24, 2015, by the USPTO, re U.S. Appl. No. 13/099,307".
"International Preliminary Report on Patentability, by the IPEA/US, dated Jul. 16, 2014, re PCT/US2013/042345".
International Search Report and Written Opinion, dated Nov. 23, 2011, re PCT/US2011/034863.
"International Search Report and Written Opinion dated Dec. 2, 2013, by the ISA/US, re PCT/US2013/042345".
Kurita T., et al., "Network Wireless Sensor for Remote Monitoring of Gas Wells," Fuji Electric Review Journal, 2006, vol. 53 (1), pp. 17-20.
"Mexico Office Action, dated Oct. 31, 2014, re App No. MX/a/2012/012444".
"Mexico Office Action, dated Sep. 19, 2013, re App No. MX/a/2012/012444".
"Mexico office action re App No. MX/F/2012/003572".
"Mexico Office Action, dated Jun. 13, 2014, re App No. MX/a/2012/012444".
"Notice of Allowance dated Apr. 12, 2006, by the USPTO, re U.S. Appl. No. 10/755,456".
"Notice of Allowance, dated May 16, 2014, by the USPTO, re U.S. Appl. No. 29/420,448".
"Notice of Allowance dated Oct. 19, 2015, by the USPTO, re U.S. Appl. No. 29/503,568".
"Notice of Allowance dated Oct. 7, 2011, by the USPTO, re U.S. Appl. No. 29/393,452".
"Notice of Allowance dated Oct. 7, 2011, by the USPTO, re U.S. Appl. No. 29/393,453".
"Notice of Allowance dated Oct. 7, 2011, by the USPTO, re U.S. Appl. No. 29/393,454".
"Office Action dated Aug. 30, 2005, by the USPTO, re U.S. Appl. No. 10/755,456".
"Office Action dated Feb. 21, 2006, by the USPTO, re U.S. Appl. No. 10/755,456".
"Office Action dated Oct. 7, 2005, by the USPTO, re U.S. Appl. No. 10/755,456".
"Office Action dated Sep. 17, 2013, by the USPTO, re U.S. Appl. No. 13/099,307".
"Office Action dated Sep. 30, 2014, by the USPTO, re U.S. Appl. No. 13/099,307".
"Pakistan office action re App No. 16438-D".
PC-102-Dome specification sheet, Available at http://troirfid.com and yahoo.sub.site.sub.admin/assets/docs/PC-102.sub/Dome.277173131.xls, last visited Jul. 12, 2011.
Petersen S., et al., "A Survey of Wireless Technology for the Oil and Gas Industry," Society of Petroleum Engineers, 2008 SPE Intelligent Energy Conference and Exhibition, Feb. 25-27, 2008, Amsterdam, The Netherlands.

(56) References Cited

OTHER PUBLICATIONS

"Russian Office Action dated Oct. 21, 2013, re App No. 2012503905".
Schempf, Hagen, Ph.D., "GasNet: Gas Main Sensor and Communications Network System, Phase 1 Topical Report," Document No. REP-GOV, DOE-020303, Work Performed by Automatika, Inc., Pittsburgh, PA15238, Feb. 27, 2003.
TROI-Home, http://www.troirfid.com, last visited Jul. 12, 2011.
"Supplemental European Search Report, dated Apr. 8, 2015, re EP App No. 11775718.7".

BAND WITH RFID CHIP HOLDER AND IDENTIFYING COMPONENT

CROSS-REFERENCE TO RELATED APPLICATION

This application claims priority to, and the benefit of the filing date of, U.S. patent application No. 62/031,156, filed Jul. 30, 2014, the entire disclosure of which is hereby incorporated herein by reference.

TECHNICAL FIELD

This disclosure relates in general to a system for pumping fluid to a wellhead and, in particular, to improved apparatus and methods for identifying a component of the system.

BACKGROUND OF THE DISCLOSURE

Several systems are used to facilitate oil and gas exploration and production operations. One example is a hydraulic fracturing (or "frac") system, which pumps fluid to a wellhead for the purpose of propagating factures in a formation through which a wellbore extends, the wellhead being the surface termination of the wellbore. In many cases, different components of different hydraulic fracturing systems need to be identified and tracked in order to, for example, improve safety by replacing system components before they unexpectedly fail, reduce system downtime and cost by eliminating unexpected component failures and/or component performance degradations, and facilitate planning of future systems by identifying suitable existing components for the future systems. Therefore, what is needed is an apparatus or method that addresses one or more of the foregoing issues, and/or other issue(s).

SUMMARY

In a first aspect, there is provided an apparatus that includes a band adapted to be coupled to a component of a system associated with a wellhead, the band including first and second ends; a buckle coupled to the band and located proximate to the first end; a holder coupled to the band, wherein the holder is positioned, or is adapted to be positioned, proximate to the first end; an electronic identifying device attached to the holder and adapted to identify the component to which the band is adapted to be coupled; and an identifying component positioned on the band; wherein the identifying component visually conveys information about at least one of: the electronic identifying device, and the component to which the band is adapted to be coupled.

In an exemplary embodiment, the system associated with the wellhead is a system for pumping fluid to the wellhead; wherein the electronic identifying device is, or includes, an RFID chip; and wherein the holder includes a block to which the electronic identifying device is fixedly attached, and a recess formed in the block and in which at least a portion of the RFID chip is disposed.

In another exemplary embodiment, the buckle is coupled to the band and positioned proximate to the first end so that the buckle is positioned, along the length of the band, between the first end and the holder; and wherein the identifying component is positioned on the band so that the buckle is positioned, along the length of the band, between the first end and the identifying component.

In yet another exemplary embodiment, the holder is positioned, or is adapted to be positioned, proximate to the first end so that the holder is either: positioned, along the length of the band, between the buckle and the identifying component; or adapted to be positioned, along the length of the band, between the buckle and the identifying component.

In certain exemplary embodiments, the holder is movably coupled to the band and is permitted to move along the length of the band to be positioned between the buckle and the identifying component.

In an exemplary embodiment, the holder is fixedly attached to the band so that the holder is positioned, along the length of the band, between the buckle and the identifying component.

In another exemplary embodiment, the identifying component includes indicia positioned on the band, the indicia visually communicating information about at least one of the electronic identifying device and the component to which the band is adapted to be coupled; and wherein the holder is positioned, or is adapted to be positioned, proximate to the first end so that the holder is either: positioned, along the length of the band, between the buckle and the indicia; or adapted to be positioned, along the length of the band, between the buckle and the indicia.

In yet another exemplary embodiment, when the holder is positioned along the length of the band between the buckle and the indicia, the band has more continuous surface area for the indicia, allowing the indicia to be expressed along a longer continuous area of the band, because the holder is positioned in closer proximity to the buckle.

In certain exemplary embodiments, the identifying component includes indicia positioned on the band, the indicia visually communicating information about at least one of the electronic identifying device and the component to which the band is adapted to be coupled.

In an exemplary embodiment, the indicia is etched, printed, painted, embossed, or lasered on the band.

In another exemplary embodiment, at least a portion of the indicia is located, along the length of the band, in the first ½, ⅓, ¼, ⅕, ⅙, ⅛, ⅑, ⅒, or 1/11 portion of the length relative to the first end.

In yet another exemplary embodiment, the apparatus includes the component; wherein the band is coupled to the component; and wherein the component is a section of pipe, a fitting, valve, a frac or well service pump component, a fluid line, a manifold, a fluid connection, or any combination thereof.

In a second aspect, there is provided an apparatus that includes a band, wherein the band is adapted to be coupled to a component of a system associated with a wellhead; wherein the band is adapted to be coupled to an electronic identifying device; and wherein the band is adapted to have an identifying component positioned thereon.

In an exemplary embodiment, the apparatus includes a holder secured to the band, wherein the holder is adapted to support the electronic identifying device.

In another exemplary embodiment, the band has first and second ends, and the holder is movable between the first and second ends.

In yet another exemplary embodiment, the holder is either welded to the band or attached to the band with adhesive.

In certain exemplary embodiments, the apparatus includes the identifying component; wherein the identifying component is positioned on the band.

In an exemplary embodiment, the identifying component is etched, printed, embossed, lasered, or painted on the band.

In another exemplary embodiment, the apparatus includes the electronic identifying device to which the band is coupled; wherein the electronic identifying device is positioned proximate the identifying component; and wherein the electronic identifying device, and at least a portion of the identifying component, are disposed proximate a first end of the band.

In yet another exemplary embodiment, the band has first and second ends, and the first and second ends are buckled, welded, snapped, tied, or twisted together.

In certain exemplary embodiments, the identifying component includes indicia visually communicating information about at least one of the electronic identifying device and the component to which the band is adapted to be coupled, where the indicia is positioned between the electronic identifying device and a second end of the band.

In an exemplary embodiment, the indicia extends a majority of the length of the band between the electronic identifying device and the second end of the band.

In another exemplary embodiment, the apparatus includes the component; wherein the band is coupled to the component; and wherein the component is a section of pipe, a fitting, a valve, a frac or well service pump component, a fluid line, a manifold, a fluid connection, or any combination thereof.

DESCRIPTION OF FIGURES

The accompanying drawings facilitate an understanding of the various embodiments.

DETAILED DESCRIPTION

Figure 1A:
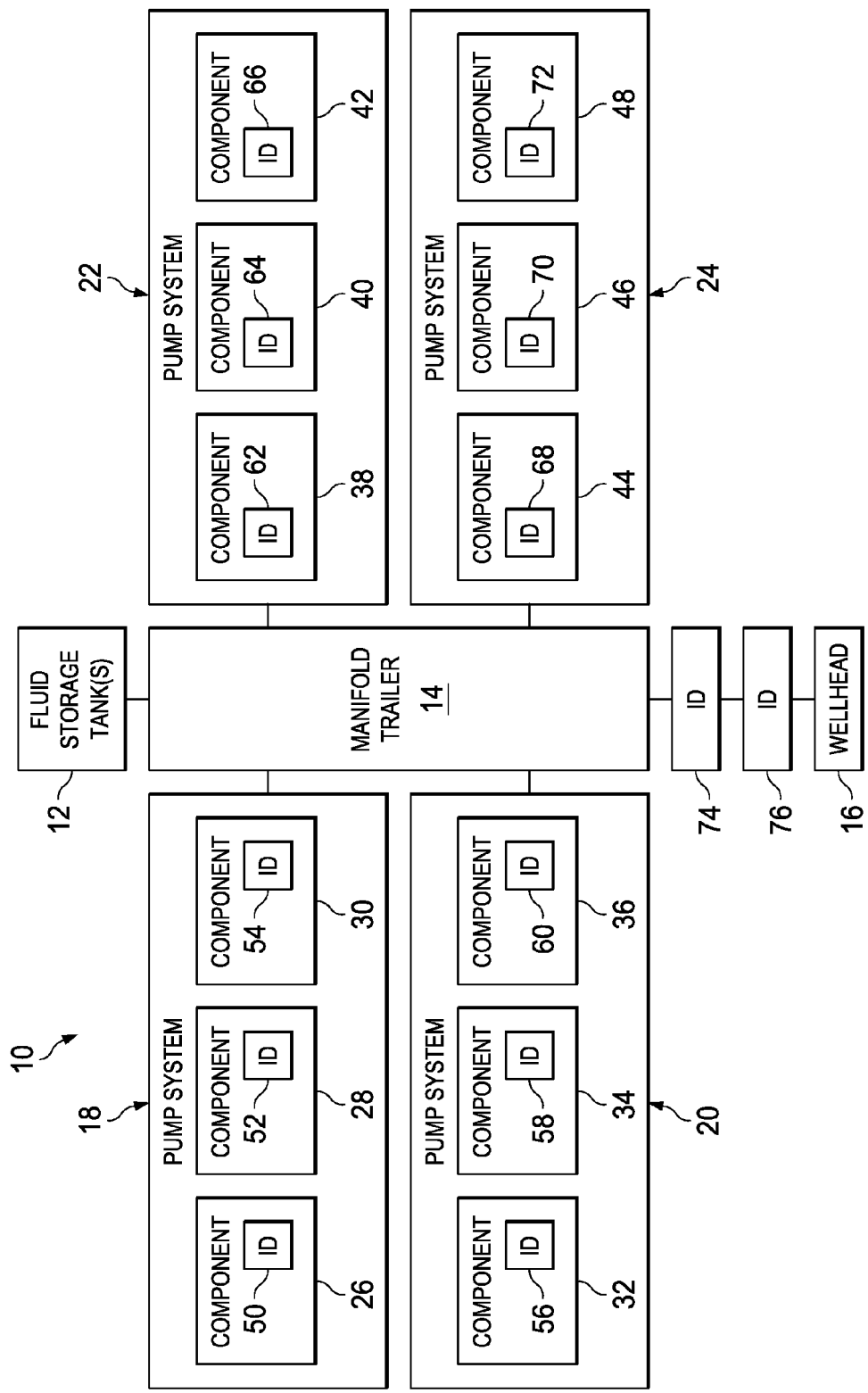
FIGS. 1A and 1B are diagrammatic illustrations of a system for pumping fluid to a wellhead according to an exemplary embodiment, the system including identifiers.
Figure 1B:
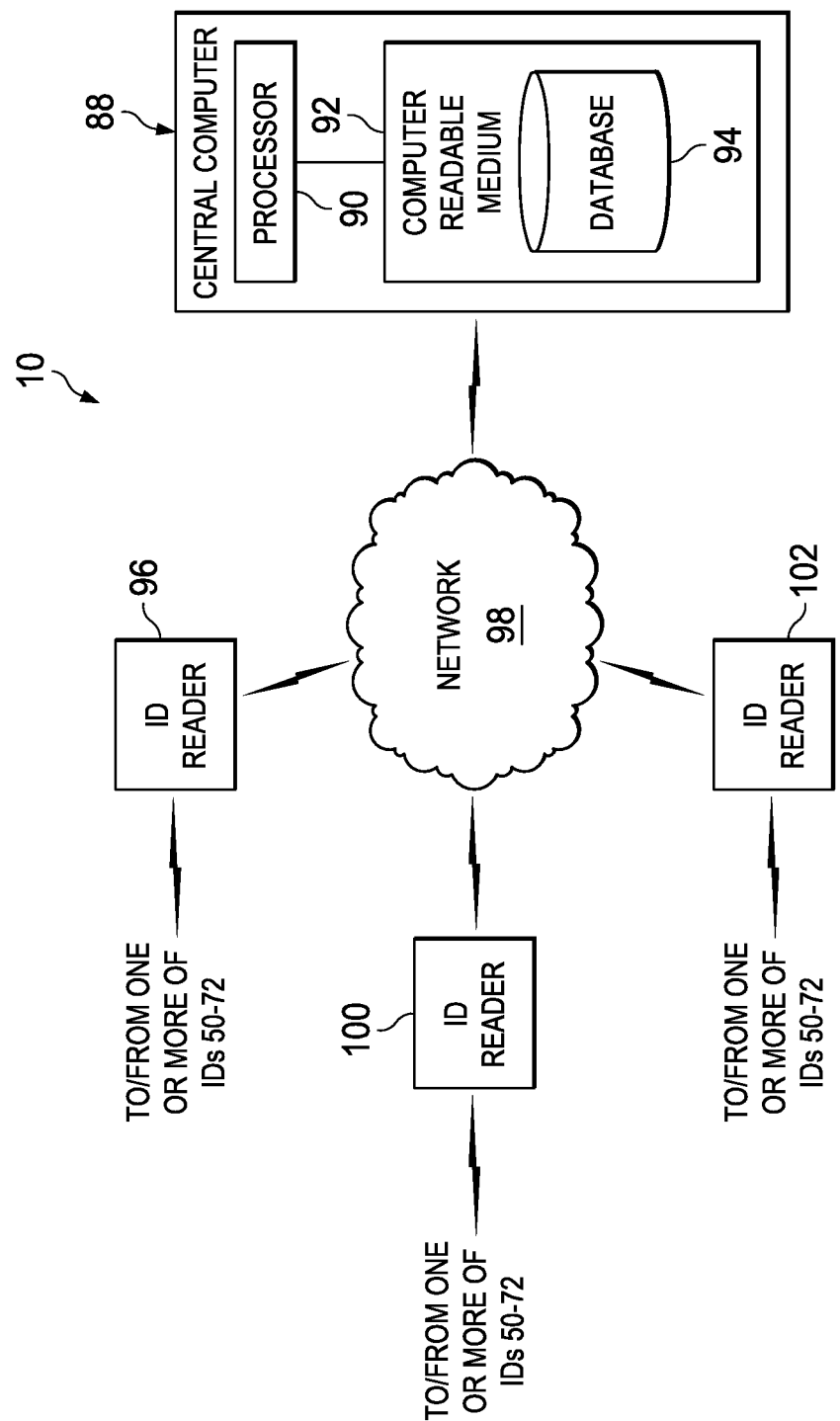

In an exemplary embodiment, as illustrated in FIGS. 1A and 1B, a system is generally referred to by the reference numeral 10 and includes one or more fluid storage tanks 12 for a fracturing system. The exemplary embodiments provided herein are not limited to a fracturing system as the embodiments may used or adapted to a mud pump system, well treatment system, or other pumping system.

A manifold trailer 14 is in fluid communication with the fluid storage tanks 12. A wellhead 16 is in fluid communication with the manifold trailer 14 via one or more fluid lines 17. The wellhead 16 is the surface termination of a wellbore (not shown). Pump apparatuses or systems 18, 20, 22 and 24 are in fluid communication with the manifold trailer 14. The pump system 18 includes apparatuses or components 26, 28 and 30. The pump system 20 includes components 32, 34 and 36. The pump system 22 includes components 38, 40 and 42. The pump system 24 includes components 44, 46 and 48.

In an exemplary embodiment, the system 10 is configured to pump fluid to the wellhead 16. More particularly, one or more of the pump systems 18, 20, 22 and 24 pump fluid from the fluid storage tanks 12 to the wellhead 16 via at least the manifold trailer 14 and the fluid lines 17. In an exemplary embodiment, the system 10 is, includes, or is part of, a hydraulic fracturing (or "frac") system. In an exemplary embodiment, the fluid storage tanks 12 are frac tanks. In an exemplary embodiment, each of the pump systems 18, 20, 22 and 24 is, includes, or is part of, a frac truck, a frac or well service pump, and/or any combination thereof. In an exemplary embodiment, each of the components 26, 28, 30, 32, 34, 36, 38, 40, 42, 44, 46 and 48 is a tubular member, which may be, or may be a part of, a section of pipe, a fitting, a valve, a frac or well service pump component, a fluid line, a manifold, a fluid connection, and/or any combination thereof. In an exemplary embodiment, each of the components 26, 28, 30, 32, 34, 36, 38, 40, 42, 44, 46 and 48 is a section of pipe, a fitting, a valve, a frac or well service pump component, a fluid line, a manifold, a fluid connection, and/or any combination thereof.

As shown in FIG. 1A, identifiers 50, 52 and 54 are coupled to the components 26, 28 and 30, respectively, of the pump system 18. Identifiers 56, 58 and 60 are coupled to the components 32, 34 and 36, respectively, of the pump system 20. Identifiers 62, 64 and 66 are coupled to the components 38, 40 and 42, respectively, of the pump system 22. Identifiers 68, 70 and 72 are coupled to the components 44, 46 and 48, respectively, of the pump system 24. Identifiers 74 and 76 are coupled to the fluid lines 17. The identifiers 50-76 are adapted to be scanned or read, as will be described in further detail below.

As shown in FIG. 1B, the system 10 further includes a computer 88, which includes a processor 90 and a computer readable medium 92 operably coupled thereto. Instructions accessible to, and executable by, the processor 90 are stored in the computer readable medium 92. A database 94 is also stored in the computer readable medium 92. An identification (ID) interrogator or reader 96 is operably coupled to, and in communication with, the computer 88 via a network 98. Likewise, ID readers 100 and 102 are each operably coupled to, and in communication with, the computer 88 via the network 98. Each of the ID readers 96, 100 and 102 is adapted to transmit signals to, and receive signals from, one or more of the identifiers 50-76.

In an exemplary embodiment, each of the identifiers 50-76 is a radio frequency identification (RFID) tag, and each of the ID readers 96, 100 and 102 is an RFID reader. In an exemplary embodiment, each of the identifiers 50-76 is a radio frequency identification (RFID) tag, and each of the ID readers 96, 100 and 102 is an MC9090-G Handheld RFID Reader, which is available from Motorola Solutions, Inc., Schaumburg, Ill.

In several exemplary embodiments, the computer 88 is a workstation, personal computer, server, portable computer, smartphone, personal digital assistant (PDA), cell phone, another type of computing device, and/or any combination thereof. In an exemplary embodiment, the computer 88 is part of one or more of the ID readers 96, 100 and 102. In an exemplary embodiment, the network 98 includes the Internet, one or more local area networks, one or more wide area networks, one or more cellular networks, one or more wireless networks, one or more voice networks, one or more data networks, one or more communication systems, and/or any combination thereof. In several exemplary embodiments, one or more of the components of the system 10 and/or content stored therein, and/or any combination thereof, are parts of, and/or are distributed throughout, the system 10 and/or one or more other components thereof. In several exemplary embodiments, the platforms of the system 10 are identical, different, or vary with respect to equipment, peripherals, hardware architecture and/or specifications, software architecture and/or specifications, and/or any combination thereof.

Figure 2:
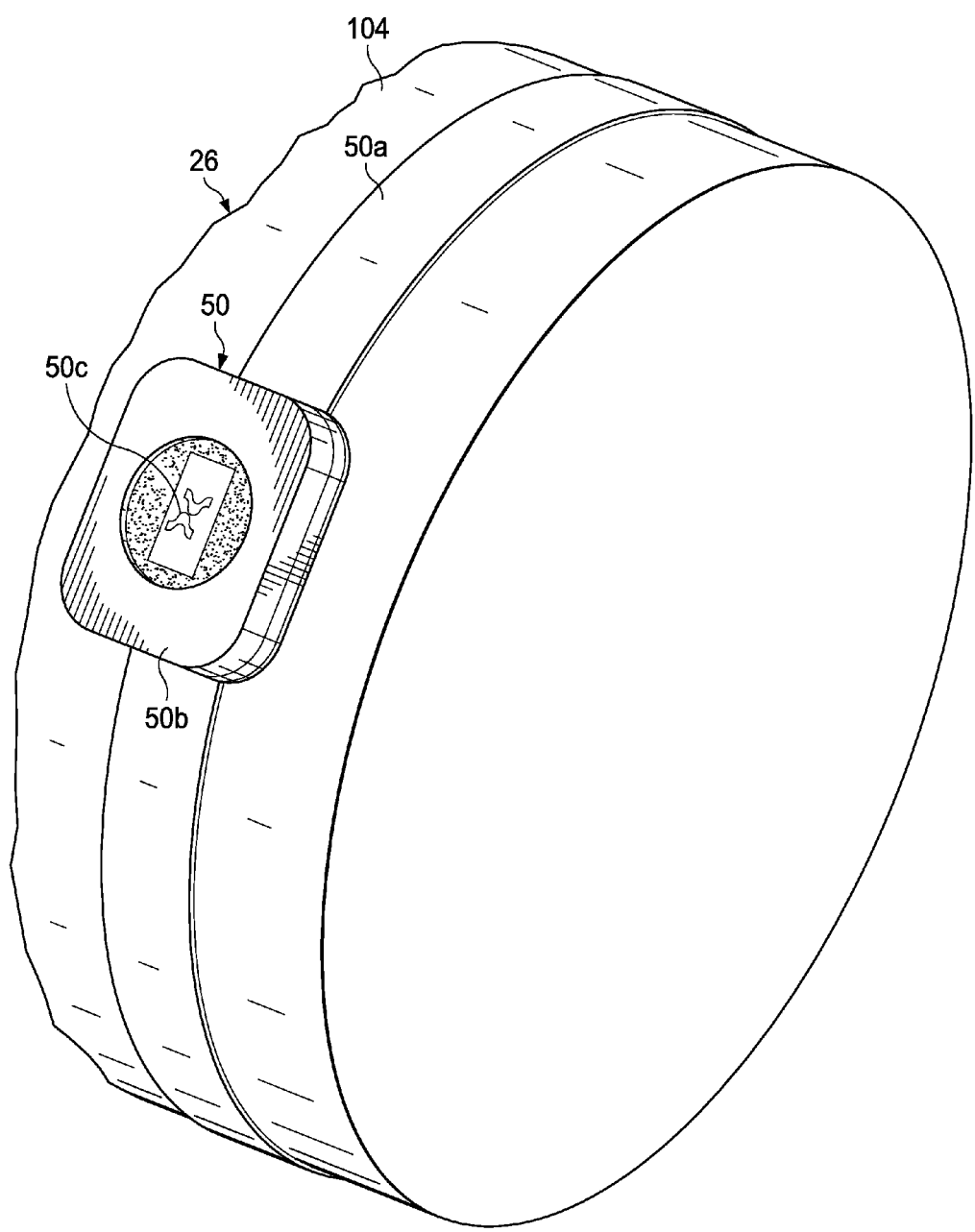
FIG. 2 is a perspective view of one of the identifiers illustrated in FIG. 1A engaging a tubular member, according to an exemplary embodiment.

In an exemplary embodiment, as illustrated in FIG. 2 with continuing reference to FIGS. 1A and 1B, the identifier 50 includes a band 50a and a holder 50b coupled thereto. An electronic identifying device 50c is fixedly attached to the holder 50b. As shown in FIG. 2, the component 26 is a tubular member 104 such as, for example, a section of pipe. The band 50a is coupled to the tubular member 104; in an exemplary embodiment, the band 50a extends circumferentially around the tubular member 104.

Figure 3:
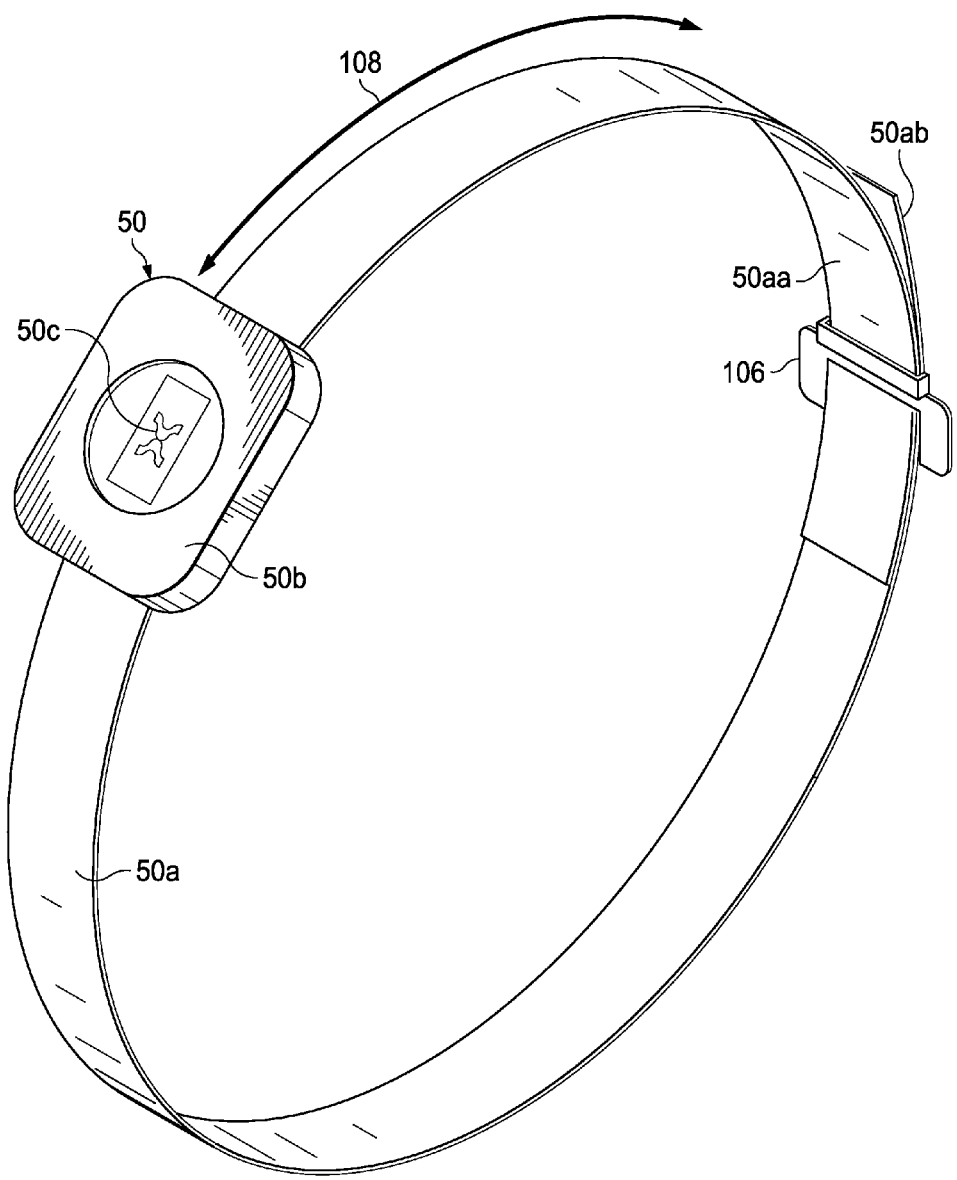
FIG. 3 is another perspective view of the identifier of FIG. 2, but with the tubular member omitted, according to an exemplary embodiment.
Figures 4, 5:
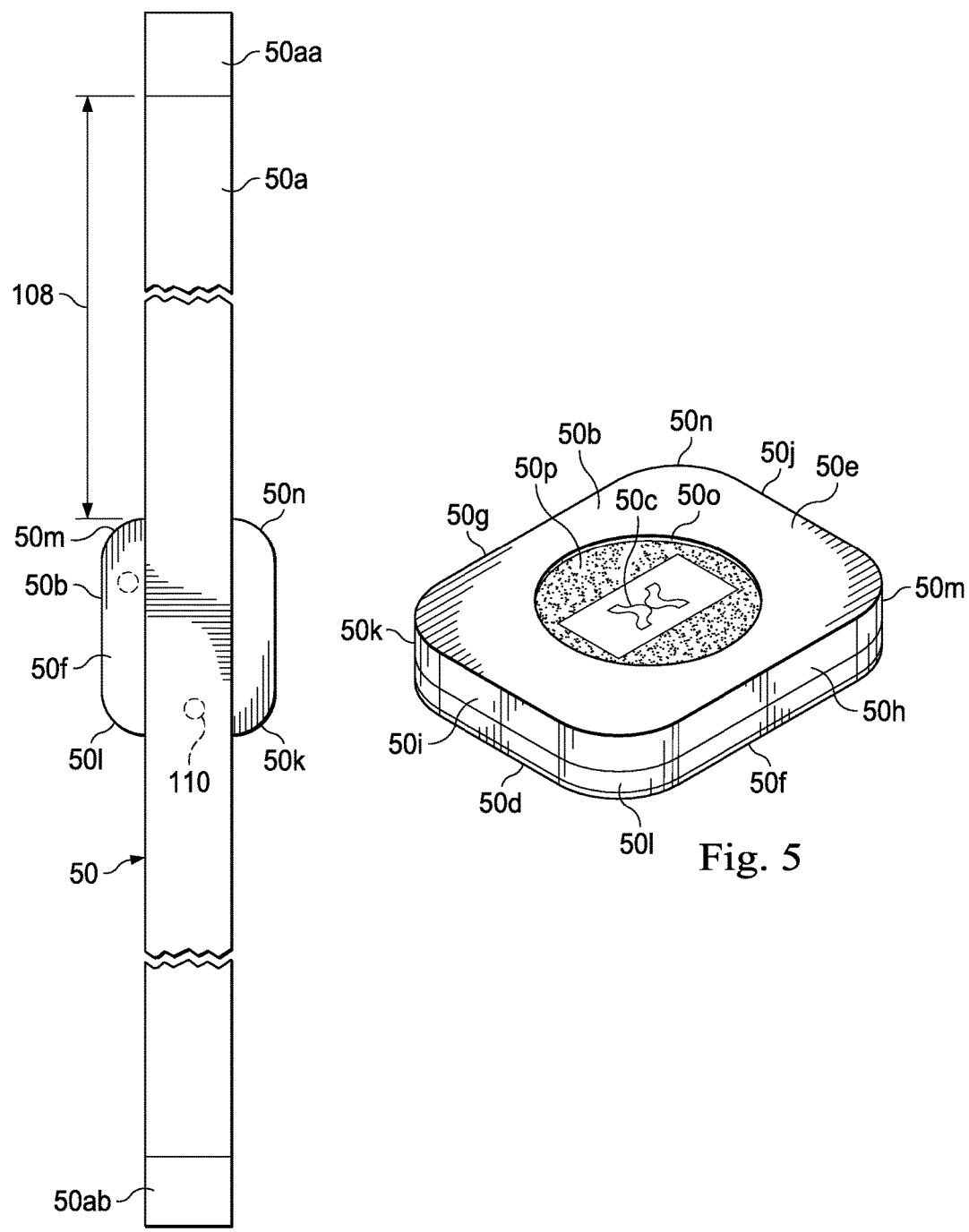
FIG. 4 is a bottom plan view of the identifier of FIGS. 2 and 3, according to an exemplary embodiment.
FIG. 5 is a perspective view of a portion of the identifier of FIGS. 2, 3 and 4, according to an exemplary embodiment.

In an exemplary embodiment, as illustrated in FIGS. 3 and 4 with continuing reference to FIGS. 1A, 1B and 2, the band 50a includes opposing end portions 50aa and 50ab, which are coupled together via a buckle 106; the buckle 106 is coupled to the band 50a. The opposing end portions 50aa and 50ab are coupled together so that relative movement between the band 50a and the tubular member 104 is prevented. In an exemplary embodiment, the holder 50b is fixedly attached to the band 50a so that a fixed spacing 108 is defined along the band 50a and between the holder 50b and the end portion 50aa. In an exemplary embodiment, the fixed spacing 108 is defined along the band 50a and between the holder 50b and the end portion 50aa at the distal end thereof. In an exemplary embodiment, the fixed spacing 108 is defined along the band 50a and between the holder 50b and the end portion 50aa at the position at which the buckle 106 engages the end portion 50aa. In an exemplary embodiment, the fixed spacing 108 ranges from greater than 0 inches to about 36 inches. In an exemplary embodiment, the fixed spacing 108 ranges from greater than 0 inches to about 10 inches. In an exemplary embodiment, the fixed spacing 108 ranges from about 1 inch to about 9 inches. In an exemplary embodiment, the fixed spacing 108 ranges from about 2 inches to about 8 inches. In an exemplary embodiment, the fixed spacing 108 ranges from about 3 inches to about 7 inches. In an exemplary embodiment, the fixed spacing 108 ranges from about 4 inches to about 6 inches. In an exemplary embodiment, the fixed spacing 108 ranges from about 5.5 inches to about 6.5 inches. In an exemplary embodiment, the fixed spacing 108 is about 6 inches.

In alternative exemplary embodiments, instead of being coupled to the band 50a so that the holder 50b is fixedly attached to the band 50a, the holder 50b is coupled to the band 50a by being movably mounted to the band 50a; since the holder 50b is movably mounted to the band 50a, the holder 50b is permitted to slide or otherwise move to different positions along the band 50a.

In an exemplary embodiment, as illustrated in FIG. 5 with continuing reference to FIGS. 1A, 1B, 2, 3 and 4, the holder 50b includes a block 50d to which the electronic identifying device 50c is fixedly attached. The block 50d includes sides 50e and 50f spaced in a parallel relation, sides 50g and 50h spaced in a parallel relation and extending between the sides 50e and 50f, and sides 50i and 50j spaced in a parallel relation and extending between the sides 50e and 50f. A round 50k extends between the sides 50g and 50i, a round 50l extends between the sides 50i and 50h, a round 50m extends between the sides 50h and 50j, and a round 50n extends between the sides 50j and 50g. The rounds 50k, 50l, 50m and 50n define respective radiuses, which, in an exemplary embodiment, are equal to each other. A recess 50o is formed in the side 50e of the block 50d. The electronic identifying device 50c is at least partially disposed in the recess 50o. A material 50p is disposed in the recess 50o. In an exemplary embodiment, the material 50p facilitates the fixed attachment of the electronic identifying device 50c to the block 50d. In several exemplary embodiments, the material 50p is an elastomeric material, an epoxy, a potting compound or material, and/or any combination thereof.

In an exemplary embodiment, the identifier 50 is an RFID tag, and the electronic identifying device 50c is, or includes, an RFID chip, at least a portion of which is disposed in the recess 50o.

Referring back to FIG. 4, the side 50f of the holder 50b is fixedly attached to the band 50a via at least one spot weld 110. In an exemplary embodiment, the side 50f of the holder 50b is fixedly attached to the band 50a via the spot weld 110 and one or more additional spot welds. In several exemplary embodiments, instead of, or in addition to the spot weld 110, the side 50f of the holder 50b is fixedly attached to the band 50a via an adhesive, at least one fastener, or any combination thereof. In alternative exemplary embodiments, instead of being coupled to the band 50a so that the holder 50b is fixedly attached to the band 50a, the holder 50b is coupled to the band 50a by being movably mounted to the band 50a; since the holder 50b is movably mounted to the band 50a, the holder 50b is permitted to slide or otherwise move to different positions along the band 50a.

In an exemplary embodiment, each of the identifiers 52-76 is identical to the identifier 50 and therefore will not be described in further detail. In an exemplary embodiment, one or more of the identifiers 52-72 are coupled to the components 26-48, respectively, using respective bands that are similar to the band 50a and in a manner similar to the manner by which the identifier 50 is coupled to the tubular member 104. In an exemplary embodiment, one or both of the identifiers 74 and 76 are coupled to the fluid lines 17 using respective bands that are similar to the band 50a and in a manner similar to the manner by which the identifier 50 is coupled to the tubular member 104.

With continuing reference to FIGS. 1A, 1B, 2, 3, 4 and 5, the operation of the system 10 may be implemented in whole or in part using the computer 88, one or more of the ID readers 96, 100 and 102, or any combination thereof. As an example, aspects of the operation of the system 10 will be described with respect to the identifier 50 and the component 26. However, operational aspects with respect to any of the identifiers 52-76 and the components 28-48 (or the fluid lines 17), are identical to the operational aspects with respect to the identifier 50 and the component 26, but for replacing the identifier 50 with one of the identifiers 52-76, and replacing the component 26 with one of the components 28-48 or the fluid lines 17.

In operation, in an exemplary embodiment with continuing reference to FIGS. 1A, 1B, 2, 3 and 4 and 5, the component 26 is identified by receiving information or data that identifies the component 26. More particularly, the identifier 50 is coupled to the component 26 in accordance with the foregoing, with the band 50a engaging the component 26. The electronic identifying device 50c is detected using one of the ID readers 96, 100 and 102, thereby identifying the component 26. For example, the ID reader 96 sends at least one signal to the electronic identifying device 50c and then receives response signal(s) from the electronic identifying device 50c, the response signal(s) including identification information such as, for example, a stock number or unique tag serial number that identifies the component 26. This identification information and/or data associated therewith are transmitted from the ID reader 96 to the computer 88. In an exemplary embodiment, the transmitted information and/or data is stored in the database 94.

In an exemplary embodiment, the component 26 is the tubular member 104 and the identifier 50 is coupled to the tubular member 104 in accordance with the foregoing, with the band 50a extending circumferentially around the tubular member 104 and the opposing end portions 50aa and 50ab being coupled together so that relative movement between the band 50a and the tubular member 104 is prevented. The prevention of relative movement between the band 50a and the tubular member 104, the fixed attachment of the holder 50b to the band 50a and thus the fixed spacing 108 between the holder 50b and the end portion 50aa of the band 50a, and the fixed attachment of the electronic identifying device 50c to the holder 50b, fixes the location of the electronic identifying device 50c relative to the tubular member 104, thereby facilitating detection of the electronic identifying device 50c and thus identification of the tubular member 104 and, if applicable, the identification of the component 26 of which the tubular member 104 is a part.

In an exemplary embodiment, the fixed location of the electronic identifying device 50c, relative to each of the band 50a and the tubular member 104, facilitates identification of the tubular member 104 because the electronic identifying device 50c is permanently at a position that is consistently, readily and easily accessible to, for example, the ID reader 96. As a result, an operator of the ID reader 96 can place the ID reader 96 at a predetermined position at which the detection of the electronic identifying device 50c using the ID reader 96 is ensured and repeatable. Thus, the need for the operator of the ID reader 96 to search for the electronic identifying device 50c on the tubular member 104, and/or manually place the ID reader 96 in different positions until the ID reader 96 is able to detect the electronic identifying device 50c, is eliminated. As a result, the identification of all of the components in the system 10 can be quickly and efficiently accomplished.

In an exemplary embodiment, the fixed location of the electronic identifying device 50c, relative to each of the band 50a and the tubular member 104, facilitates identification of the tubular member 104 because the electronic identifying device 50c is permanently at a position that is consistently, readily and easily accessible to an automatic or robotic system that includes, for example, the ID reader 96 and/or equipment similar thereto; as a result, the automatic or robotic system can place the ID reader 96 and/or equipment similar thereto at a predetermined position at which the detection of the electronic identifying device 50c is ensured and repeatable.

As noted above, in alternative exemplary embodiments, instead of being coupled to the band 50a so that the holder 50b is fixedly attached to the band 50a, the holder 50b is coupled to the band 50a by being movably mounted to the band 50a; since the holder 50b is movably mounted to the band 50a, the holder 50b is permitted to slide or otherwise move to different positions along the band 50a.

As noted above, although aspects of the operation of the system 10 have been described above in connection with the identifier 50 and the component 26, the corresponding operational aspects with respect to any of the identifiers 52-76 and the components 28-48 (or the fluid lines 17) are identical to that in connection with the identifier 50 and the component 26, but for replacing the identifier 50 with one of the identifiers 52-76 and replacing the component 26 with one of the components 28-48 or the fluid lines 17.

In several exemplary embodiments, a computer program, such as a plurality of instructions stored on a computer readable medium (for example, the computer readable medium 92, the database 94, and/or any combination thereof), may be executed by a processor to cause the processor to carry out or implement in whole or in part the operation of the system 10. In several exemplary embodiments, such a processor may include the processor 90 and/or one or more other processors.

Figure 6:
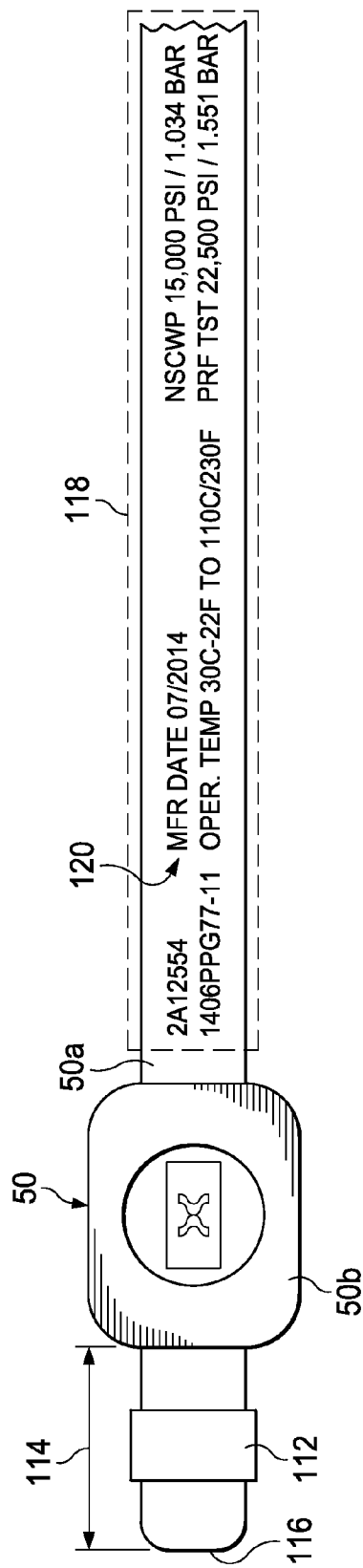
FIG. 6 is a top plan view of a band and identifier, according to an exemplary embodiment.

FIG. 6 illustrates an alternative embodiment in which the holder 50b of the identifier 50 is positioned in close proximity to a buckle 112, which is coupled to the band 50a. Placing the holder 50b close to the buckle 112 maximizes the continuous surface area of the band 50a available for stenciling and marking. In some embodiments, the holder 50b is attached to the band 50a at a distance 114 ranging between 0-15 inches away from an end 116 where the buckle 112 is located (referred to herein as "buckled end 116"). Some specific embodiments position the holder 50b a distance of 0.5, 1, 1.25, 1.33, 1.5, 1.67, 1.75, 2, or 2.5 inches away from the buckle end 116. Alternatively, the holder 50b may be positioned a certain length of the band 50a away from one of the ends of the band 50a. For example, the holder 50b may be positioned away from one end of the band 50a a distance equal to, or substantially equal to, ½, ⅓, ¼, ⅕, ⅙, ⅛, ⅑, ¹⁄₁₀, ¹⁄₁₁, or some other fraction or portion of the band 50a length, relative to one of the ends, such as the buckled end 116.

The band 50a includes an indicating portion 118 (shown within a dotted box) at which an identifying component, such as indicia 120, is coupled to, and/or positioned on, the band 50a. Indicia 120 include stenciling or markings that visually convey information about the component 26, the identifier 50, or both. In some embodiments, the indicia 120 can include a plate, tag, or other component coupled to the band 50a. In one embodiment, the indicia 120 face the same direction as the identifier 50 in order to be seen when the band is circumferentially coupled to the component 26. While, in other embodiments, the indicia 120 face inwardly toward the component 26 or are positioned along the width of the band 50a. The indicia 120 may alternatively be positioned anywhere along the holder 50b, for example without limitation, in the middle of the band 50a or proximate the non-buckled end of the band 50a.

The indicia 120 may be cut into, attached to, or drawn on the band 50a in any number of ways, including, for example but without limitation, through etching, lasering, printing, inking, marking, affixing material with adhesive, welding, embossing, or the like. Moreover, examples of the information included in the indicia 120 include, for example but without limitation, company logos, company names, pressure ratings, manufacturing dates, testing dates, safety ratings (e.g., non-shock cold working pressure rating), operational temperatures or pressures, other operational parameters, other operational parameter ratings, testing dates, testing results, certification results, conformity markings (e.g., CE mark), part serial numbers, as well as other information that may be useful to users of the component 26.

Figure 7:
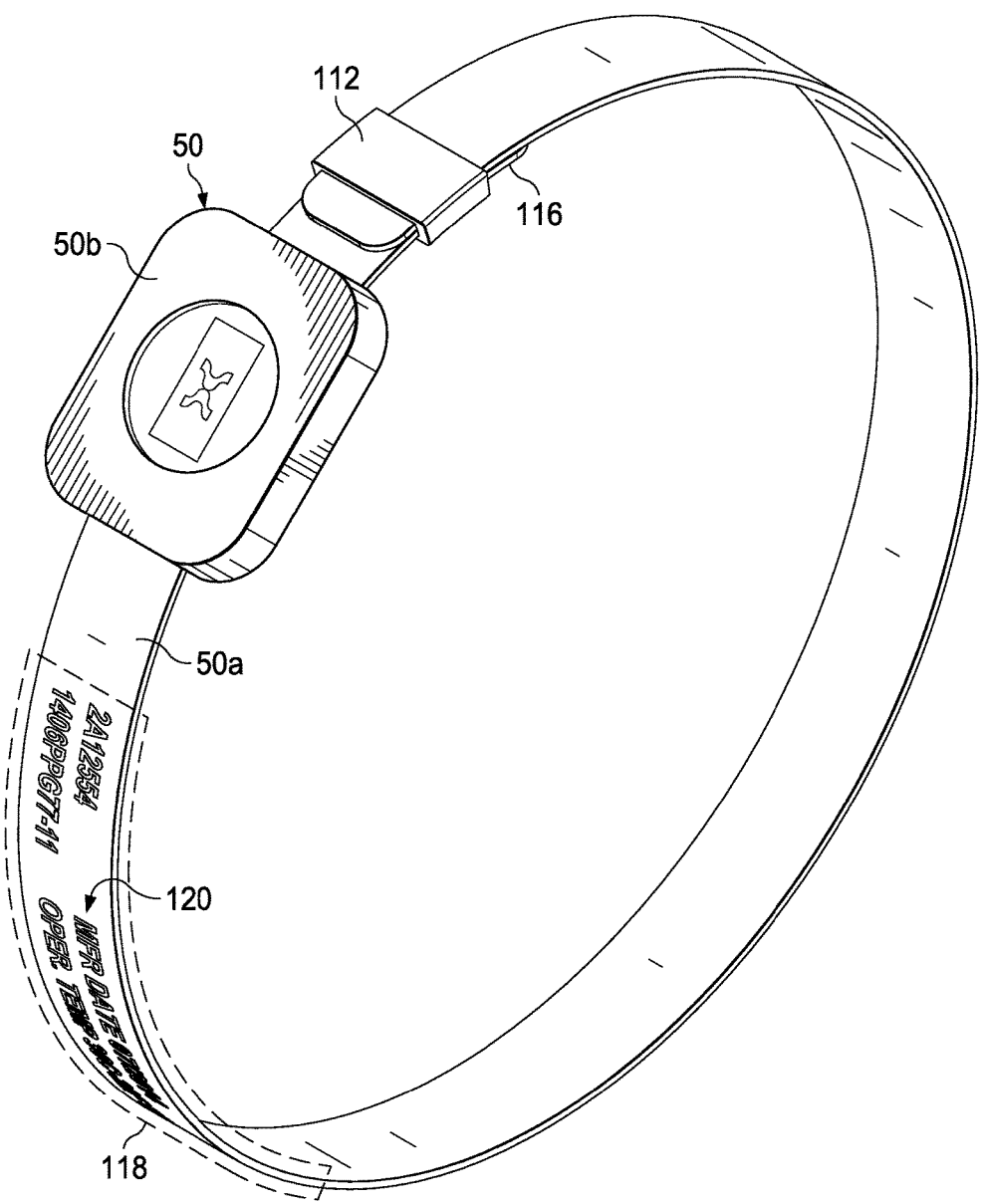
FIG. 7 is a perspective view of the band and identifier of FIG. 6 with the band oriented to engage a tubular component member, according to an exemplary embodiment.

FIG. 7 illustrates a perspective view of the alternative embodiment in FIG. 6, with the band 50a buckled together in order to circumferentially fit around the component 26. Compared to the exemplary embodiment illustrated in FIGS. 2-5, the band 50a in FIG. 7 has more continuous surface area for the indicia 120 because the holder 50b is positioned in closer proximity to the buckle 112. This allows the stenciling or markings for the indicia 120 in the indicating portion 118 to be expressed along a longer continuous area of the band 50a and not have to be broken up twice, once by the holder 50b and again by the buckle 112.

In several exemplary embodiments, the indicia 120 extends along a majority of the length of the band 50a between the electronic identifying device 50c and the non-buckled end of the band 50a.

For the sake of clarity, the band 50a has been described herein as being strapped around tubular component 26 with a circular cross section. The band 50a may be configured to fit around components 26 with other geometric cross sections, e.g., square, rectangular, triangular, hexagonal, octagonal, or the like. Thus, embodiments are not limited to bands 50a that can only fit around tubular components 26.

Referring back to FIG. 2, the dashed line along the side of the holder 50b indicates that the holder 50b includes an upper and lower portion that, when connected, encompass the electronic identifying device 50c. Alternative embodiments fashion holder 50b out of a single piece of metal, plastic, polyurethane, or other material—as implied in FIGS. 3 and 6, which do not include the dashed line running along the side of holder 50b. In other words, holder 50b may include one or more pieces.

In one embodiment, the holder 50b is fixedly coupled to the band 50a. In alternative embodiments, the holder 50b is movably mounted to the band 50a, allowing the holder 50b to slide to different positions along the band 50a. In one embodiment, the holder 50b slides to a position proximate or within the indicating portion 118.

Figure 8:
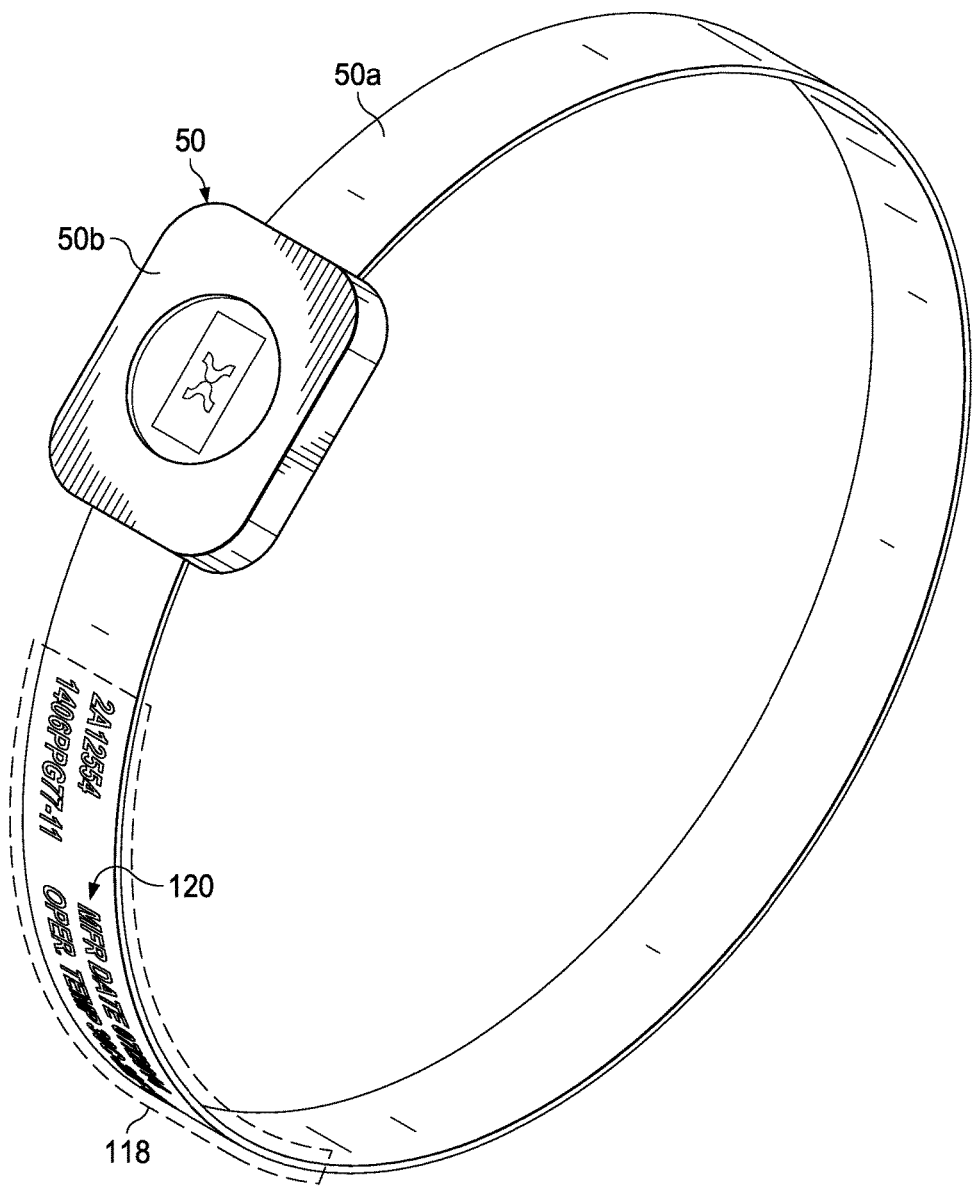
FIG. 8 is a perspective view of another embodiment of a band and identifier that includes an endless band, according to an exemplary embodiment.

FIG. 8 is a perspective view of another embodiment of the band 50a having the holder 50b attached thereto. The band 50a in FIG. 8 is an endless band, and thus does not require the coupling of any ends together. Such an endless band 50a can be manufactured out of an elastomeric or other elastic material that is stretchable onto the component 26.

Figure 9:
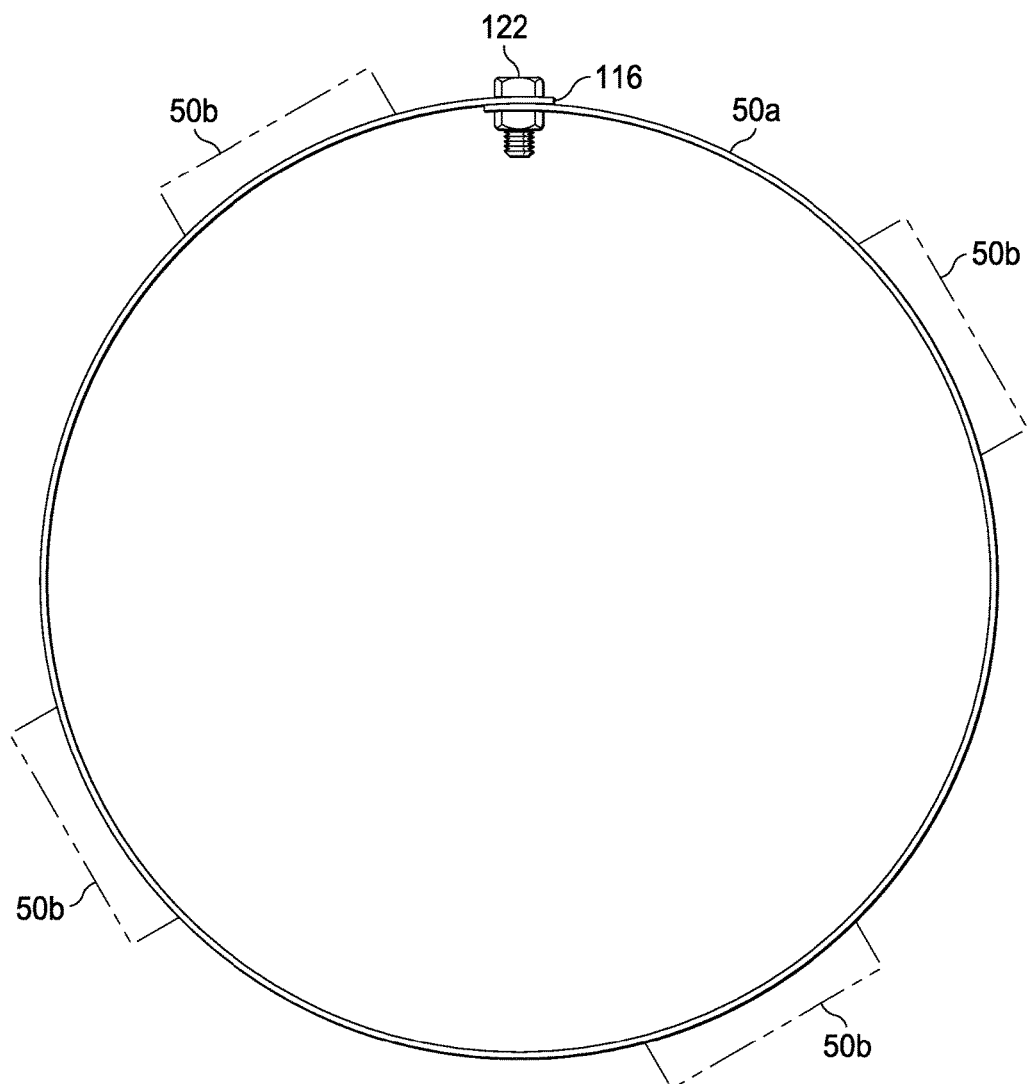
FIG. 9 is a side view of a band and holder for an identifier that includes a fastener to couple ends of the band together, according to an exemplary embodiment.

FIG. 9 is a side view of a band 50a that includes a fastener 122 to couple ends of the band 50a together, according to one embodiment. Instead of using the buckle 112, these embodiments use a fastener, such as a screw, pin, bolt, or other connector to physically hold two ends of the band 50a together, or the two ends may be welded or otherwise fused together.

FIG. 9 also shows various positions for the holder 50b, indicated by the different dotted-line boxes. The holder 50b can be fixedly positioned proximate the fastener 122 or on various other portions of the band 50a. Or, alternatively, the holder 50b can be movably coupled to the band 50a and allowed to slide to various positions between first and second ends of the band 50a, such as the various positions shown in FIG. 9.

Other types of fasteners can alternatively be used to secure the two ends of band 50b together. For example, embodiments may use snaps, fasteners, ties, twists, Velcro, adhesives, or other ways for connecting the two ends of the band 50b together.

In the foregoing description of certain embodiments, specific terminology has been used to for the sake of clarity. The disclosure is not, however, intended to be limited to the specific terms so selected, and it is to be understood that each specific term includes other technical equivalents which operate in a similar manner to accomplish a similar technical purpose. Terms such as "left" and right," "front" and "rear," "above" and "below," and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of." A corresponding meaning is to be attributed to the corresponding words "comprise," "comprised," and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. An apparatus, comprising:
    a band adapted to be coupled to a component of a system associated with a wellhead, the band comprising first and second ends;
    a buckle coupled to the band and located proximate to the first end;
    a holder coupled to the band, wherein the holder is positioned, or is adapted to be positioned, proximate to the first end;
    an electronic identifying device attached to the holder and adapted to identify the component to which the band is adapted to be coupled; and
    an identifying component positioned on the band;
    wherein the identifying component visually conveys information about at least one of:
        the electronic identifying device, and
        the component to which the band is adapted to be coupled.

2. The apparatus of claim 1, wherein the system associated with the wellhead is a system for pumping fluid to the wellhead;
    wherein the electronic identifying device is, or comprises, an RFID chip; and
    wherein the holder comprises a block to which the electronic identifying device is fixedly attached, and a recess formed in the block and in which at least a portion of the RFID chip is disposed.

3. The apparatus of claim 1, wherein the buckle is coupled to the band and positioned proximate to the first end so that the buckle is positioned, along the length of the band, between the first end and the holder; and
    wherein the identifying component is positioned on the band so that the buckle is positioned, along the length of the band, between the first end and the identifying component.

4. The apparatus of claim 3, wherein the holder is positioned, or is adapted to be positioned, proximate to the first end so that the holder is either:

positioned, along the length of the band, between the buckle and the identifying component; or adapted to be positioned, along the length of the band, between the buckle and the identifying component.

5. The apparatus of claim 4, wherein the holder is movably coupled to the band and is permitted to move along the length of the band to be positioned between the buckle and the identifying component.

6. The apparatus of claim 4, wherein the holder is fixedly attached to the band so that the holder is positioned, along the length of the band, between the buckle and the identifying component.

7. The apparatus of claim 4, wherein the identifying component comprises indicia positioned on the band, the indicia visually communicating information about at least one of the electronic identifying device and the component to which the band is adapted to be coupled; and wherein the holder is positioned, or is adapted to be positioned, proximate to the first end so that the holder is either:

positioned, along the length of the band, between the buckle and the indicia; or adapted to be positioned, along the length of the band, between the buckle and the indicia.

8. The apparatus of claim 7, wherein, when the holder is positioned along the length of the band between the buckle and the indicia, the band has more continuous surface area for the indicia, allowing the indicia to be expressed along a longer continuous area of the band, because the holder is positioned in closer proximity to the buckle.

9. The apparatus of claim 1, wherein the identifying component comprises indicia positioned on the band, the indicia visually communicating information about at least one of the electronic identifying device and the component to which the band is adapted to be coupled.

10. The apparatus of claim 9, wherein the indicia is etched, printed, painted, embossed, or lasered on the band.

11. The apparatus of claim 9, wherein at least a portion of the indicia is located, along the length of the band, in the first $1/2$, $1/3$, $1/4$, $1/5$, $1/6$, $1/8$, $1/9$, $1/10$, or $1/11$ portion of the length relative to the first end.

12. The apparatus of claim 1, further comprising the component;

wherein the band is coupled to the component; and wherein the component is a section of pipe, a fitting, a valve, a frac or well service pump component, a fluid line, a manifold, a fluid connection, or any combination thereof.

13. An apparatus comprising:

a band, wherein the band is adapted to be coupled to a component of a system associated with a wellhead;

wherein the band is adapted to be coupled to an electronic identifying device;

wherein the band is adapted to have an identifying component positioned thereon; and a holder secured to the band, wherein the holder is adapted to support the electronic identifying device;

wherein the band has first and second ends, and the holder is movable between the first and second ends.

14. The apparatus of claim 13, further comprising the identifying component;

wherein the identifying component is positioned on the band.

15. The apparatus of claim 14, wherein the identifying component is etched, printed, embossed, lasered, or painted on the band.

16. The apparatus of claim 14, further comprising the electronic identifying device to which the band is coupled;

wherein the electronic identifying device is positioned proximate the identifying component; and wherein the electronic identifying device, and at least a portion of the identifying component, are disposed proximate a first end of the band.

17. The apparatus of claim 16, wherein the identifying component comprises indicia visually communicating information about at least one of the electronic identifying device and the component to which the band is adapted to be coupled, where the indicia is positioned between the electronic identifying device and a second end of the band.

18. The apparatus of claim 17, wherein the indicia extends a majority of the length of the band between the electronic identifying device and the second end of the band.

19. The apparatus of claim 13, wherein the band has first and second ends, and the first and second ends are buckled, welded, snapped, tied, or twisted together.

20. The apparatus of claim 13, further comprising the component;

wherein the band is coupled to the component; and wherein the component is a section of pipe, a fitting, a valve, a frac or well service pump component, a fluid line, a manifold, a fluid connection, or any combination thereof.

* * * * *